(12) United States Patent
Dunn et al.

(10) Patent No.: US 7,167,934 B1
(45) Date of Patent: Jan. 23, 2007

(54) PERIPHERAL DEVICE DATA TRANSFER PROTOCOL

(75) Inventors: John C. Dunn, Issaquah, WA (US); Randall E. Aull, Kenmore, WA (US)

(73) Assignee: Microsoft Corporation, Redmond, WA (US)

( * ) Notice: Subject to any disclaimer, the term of this patent is extended or adjusted under 35 U.S.C. 154(b) by 454 days.

(21) Appl. No.: 10/658,511

(22) Filed: Sep. 9, 2003

(51) Int. Cl.
*G06F 3/00* (2006.01)
*G06F 13/00* (2006.01)
*G06F 12/00* (2006.01)

(52) U.S. Cl. .................. 710/52; 710/55; 710/56; 710/59

(58) Field of Classification Search .......... 710/8, 710/15, 33, 52, 57
See application file for complete search history.

(56) References Cited

U.S. PATENT DOCUMENTS

| | | | |
|---|---|---|---|
| 6,311,228 B1 | 10/2001 | Ray | 709/321 |
| 6,360,220 B1 | 3/2002 | Forin | 707/8 |
| 6,378,035 B1 | 4/2002 | Parry et al. | 711/110 |
| 6,654,835 B1 * | 11/2003 | Foster et al. | 710/110 |
| 6,662,297 B1 * | 12/2003 | Boom et al. | 712/245 |
| 6,892,250 B2 * | 5/2005 | Hoskins | 710/6 |
| 6,912,217 B1 * | 6/2005 | Vogel | 370/389 |
| 2003/0014590 A1 * | 1/2003 | Jeddeloh | 711/122 |

OTHER PUBLICATIONS

Cho, Kyoung-Youn and Choi, Kwang-ho; "A Novel Architecture of Home Gateway for Efficient Packet Process"; Conference Paper Institution of Electrical Engineers; 2002; pp. 63-67.
Mahramian, M.; Yazdani, N.; Faez, K.; Taheri, H.; "Neural Network Based Alhorithms for IP Lookup and Packet Classification"; First EurAsian Conference Proceedings; 2002; Lecture Notes in Computer Science vol. 2510 pp. 204-211.

* cited by examiner

*Primary Examiner*—Kim Huynh
*Assistant Examiner*—Scott Sun
(74) *Attorney, Agent, or Firm*—Workman Nydegger

(57) ABSTRACT

A client driver requests data packet transfers from a peripheral device through a protocol stack and a host controller. The protocol stack receives the data transfer request and allocates the request into the host controller schedule. The host controller schedule requests the data of the peripheral device, and directs the received data into previously allocated buffers. The host controller then sends a signal to the client driver that the respective buffers are filled. The host controller can then deactivate the instructions in the host controller schedule until further notice so that the instructions do not need to be deleted from the schedule. The client driver extracts the data from the buffer, and sends a signal to the host controller that the buffer can be used again. The request in the host controller schedule can then be reactivated without having to necessarily re-insert new instructions into the host controller schedule.

28 Claims, 5 Drawing Sheets

PERIPHERAL DEVICE DATA TRANSFER PROTOCOL

BACKGROUND OF THE INVENTION

1. The Field of the Invention

The present invention relates to systems, methods, and computer program products for transferring data packets. More particularly, the present invention relates to systems, methods, and computer program products for transferring USB data packets.

2. Background and Relevant Art

Users of computerized systems today often employ many different peripheral devices (or "components") with computerized systems in order to accomplish a variety of different purposes. For example, a user's computerized system can include an internally connected Central Processing Unit (CPU) and a storage device, which, together, can be suitable for processing very large data sets. As well, the user's computerized system can include separate, externally-connected components (e.g., a printer, a video game controller, etc.), which can enable the computerized system to be useful for drawing diagrams, for playing video games, etc.

Just as there are several types of components for use with computerized systems, so also are there many different hardware and software communication means by which such components send data to be processed by the computerized systems. For example, some internally connected components communicate data to a computerized system through a Small Computer System Interface (SCSI) protocol, or through a Peripheral Component Interconnect (PCI) protocol. Other, externally-connected components might, however, communicate with a computerized system through a variety of other interfaces including a Universal Serial Bus (USB) interface, a FireWire (IEEE 1394) interface, an Ethernet (IEEE 802.3) interface, a wireless (IEEE 802.11) interface, a Bluetooth interface, and so forth. Each of these different interfaces can use unique data communication protocols, such that each interface can provide a user with certain data communication advantages.

In some cases, the protocol that a user implements with a component can be dictated by convenience; in other cases by protocol advantages. For example, an externally connected printer can include an Ethernet port, a serial or parallel port, and a USB port. If the data transfer speeds between the user's computerized system and the printer are irrelevant for the user, the user can connect the printer based solely on the computerized systems' available communication ports. Alternatively, if data transfer speed is an issue for the user, the user can prefer to connect the printer through a port that implements a USB or Ethernet communication protocol.

Presently, USB interfaces and protocols are commonly used with certain peripheral devices such as plug-and-play devices (e.g., printers, scanners, video game controllers, digital cameras, Personal Device Assistants—PDAs). This is partly due to the ubiquity of USB interfaces on host computer systems into which the peripheral devices are intended to transfer data, as well as partly due to the speed by which a USB protocol can transfer the data. By contrast, devices transferring data at much longer rates might use protocols such as a firewire protocol, which is optimized by data transfer speeds that can be tens and hundreds of times faster than some USB protocols (e.g., USB version 1.1). In any case, device drivers that rely on data transfers through the USB interface and protocol comprise device drivers using the Network Device Interface Specification (NDIS), Bluetooth drivers for wireless transmissions, Human Interface Device (HID) drivers, and so forth. Such device drivers transfer data between the device and host computer system using the USB protocol stack.

FIG. 1 illustrates a common prior art example where a client driver uses the USB protocol stack (e.g., NDIS, Bluetooth, HID, etc.) to request and receive data from a USB-connected device. As shown, a prior art host computer system 100 can include a client driver 120 that interfaces with a USB protocol stack 130, and a host controller 110 that interfaces with a peripherally-connected USB device 105 through a host controller driver (not shown). In a typical USB environment, a client driver 120 submits one or more data requests 140 to a USB device 105 through the USB protocol stack 130 and host controller 110. Each request 140 requires the USB protocol stack 130 to process different aspects of the request through different modules 135.

This processing can comprise such instructions as placing the request 140 into the host controller 110 processing schedule, and telling the host controller 110 where to place data received from the USB device 105. The host controller 110 then follows its processing schedule. Once the host controller 110 reaches a point in its processing schedule where it is to process request 140, the host controller 110 sends an appropriate information request to the USB device 105. If the USB device 105 has any information to send, the USB device 105 will then send the information to the host controller 110.

When the host controller 110 receives the information from the USB device 105, the host controller 110 might perform one or more actions on the received information, and then send the completed request message 150 (and received information) back up through the USB stack 130 to the client driver 120. Along the way, the various USB protocol layers 135 in the USB stack 130 might then process the information by converting the received information into some sort of meaningful data. The USB protocol layers 135 might also remove the request 140 from the host controller 110 processing schedule.

The client driver repeats this request-and-receive operation continually with the host controller so that the client driver can maximize the amount of information it receives and processes from the USB device. One can appreciate that this continual sending requests and receiving completion notices (sometimes called "ping-pong IRPs"—i.e., ping-pong I/O request packets) can be relatively resource-intensive, particularly when used for protocols where low-latency is important. For example, a client driver for a video game controller might send down two or three requests for relatively small amounts of data at a time. In such a case, the amount of resources necessary to schedule and process the two or three short data requests through the protocol stack can approach the time to receive and process each short data packet coming back up through the protocol stack from the video game controller. Consequently, the amount of resource overhead for each short request can result in inconsistent feed back or output delay times between when a user enters input into a USB device, and when the host computer system processes the input into some form of appreciable output.

What is needed, therefore, are systems, methods, and computer program products that reduce the overhead that would otherwise be needed to process data packets through a protocol stack, particularly in protocols where low-latency is important. In particular, solutions are needed to allow protocols such as some networking (IP) protocols, HID, and USB Bluetooth radio communication protocols implemented over a protocol stack (e.g., the USB protocol stack) to utilize the respective protocol stack and host controller more efficiently.

BRIEF SUMMARY OF THE INVENTION

The present invention relates generally to methods, systems, and computer program products for transferring data packets in a way that reduces the overhead that can otherwise be associated with transferring data packets through a protocol stack.

In one embodiment of the present invention, a client driver initiates one or more data transfer requests to a peripheral device through a protocol stack. When initiating the request, the client driver allocates a corresponding buffer to store the corresponding data for each one or more data transfer request. The allocated buffer can comprise one or more separate buffers for each request, or can be a ring buffer with enough buffer regions for each corresponding one or more request. The initial data request from the client driver can include specific initial request instructions (e.g., one or more transfer descriptors) for each data request. The client driver then sends the initial one or more requests through the protocol stack, where the protocol stack then inserts the initial request instructions into the host controller schedule.

When the time comes in the host controller schedule for the host controller to process the initial request instructions, the host controller driver sends an appropriate data request to the peripheral device. Upon receiving the data request, the peripheral device can reply by sending any requested data it has back to the host controller. The host controller then sequentially fills each allocated buffer or buffer region with the requested data as it is received. Since the host controller can fill each allocated buffer directly, the host controller can avoid sending data back through the protocol stack. After filling each buffer, the host controller driver then sends a signal to the client driver that indicates that the respective buffer or buffer region has been filled. In addition, the initial request instructions that were placed in the host controller schedule turn "off" so that the initial request instructions remain in the host controller schedule until needed again.

An application module, such as an application program associated with the client driver, or the client driver itself, removes data from each filled buffer in the sequence that the host controller filled it. After the module removes the data from the buffer or buffer region, the client driver sends a signal back to the host controller driver indicating that the data has been removed from the respective buffer or buffer region, and so the respective buffer or buffer region becomes open. Alternatively, the application module (as well, the client driver or protocol stack) could simply replace the buffer or buffer region with a newly-allocated buffer or buffer region. When the host controller receives the signal that the respective buffer or buffer region is open, the initial request turns back "on", and the host controller makes another data transfer request to the peripheral device, and recycles the emptied buffer or buffer region. Accordingly, the present invention provides a sharing of data structure that significantly diminishes much of the overhead associated with sending and receiving multiple data transfer requests.

Additional features and advantages of the invention will be set forth in the description which follows, and in part will be obvious from the description, or can be learned by the practice of the invention. The features and advantages of the invention can be realized and obtained by means of the instruments and combinations particularly pointed out in the appended claims. These and other features of the present invention will become more fully apparent from the following description and appended claims, or can be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to both methods and systems for transferring data packets in a way that reduces the overhead or software help that can otherwise be necessary to move the data in computer system memory, particularly in protocols where low-latency is important. The embodiments of the present invention can comprise a special purpose or general-purpose computer including various computer hardware, as discussed in greater detail below.

Embodiments within the scope of the present invention also include computer-readable transmission or storage media for carrying or having computer-executable instructions or data structures stored thereon. Such computer-readable media can be any available media that can be accessed by a general purpose or special purpose computer. By way of example, and not limitation, such computer-readable storage media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable transmission medium. Thus, any such connection is properly termed a computer-readable transmission medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 1:
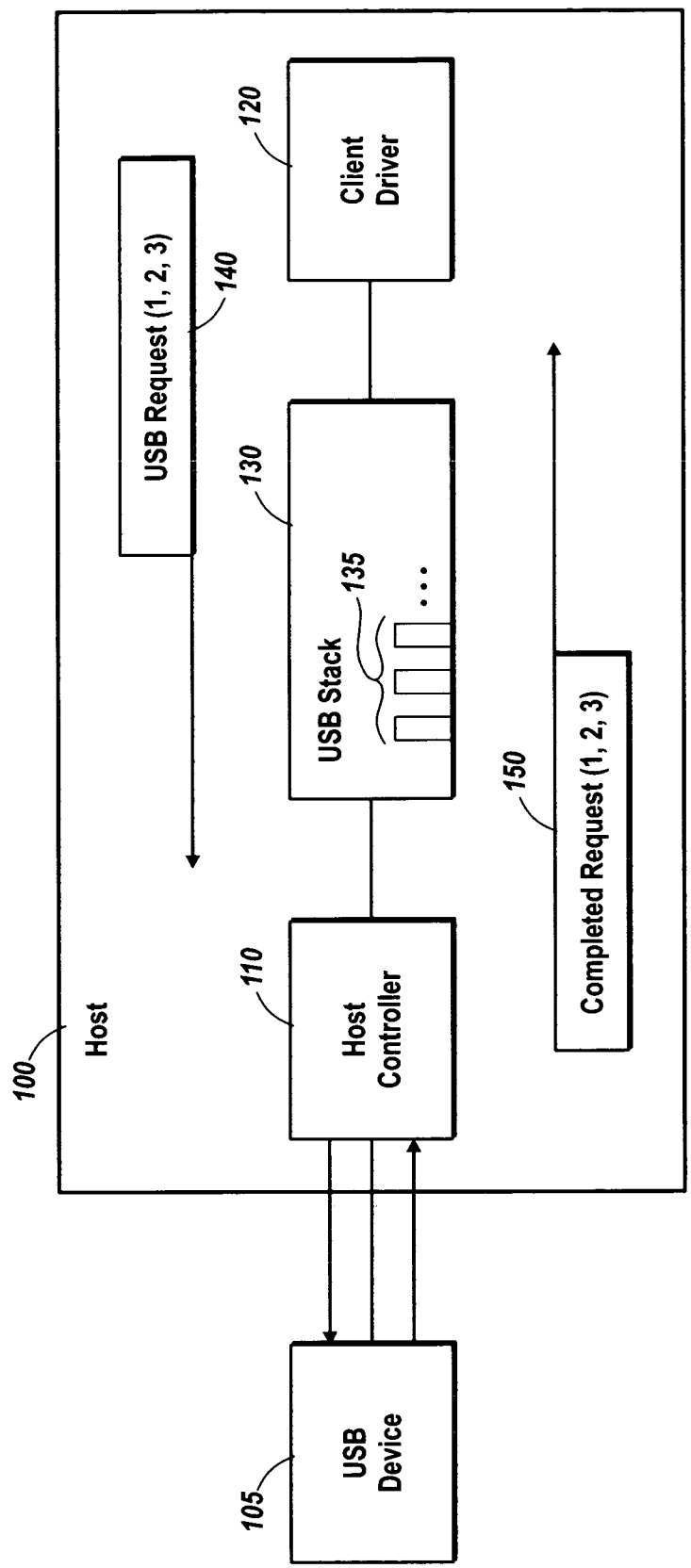
FIG. 1 illustrates a block diagram for sending data transfer requests.
Figure 2A:
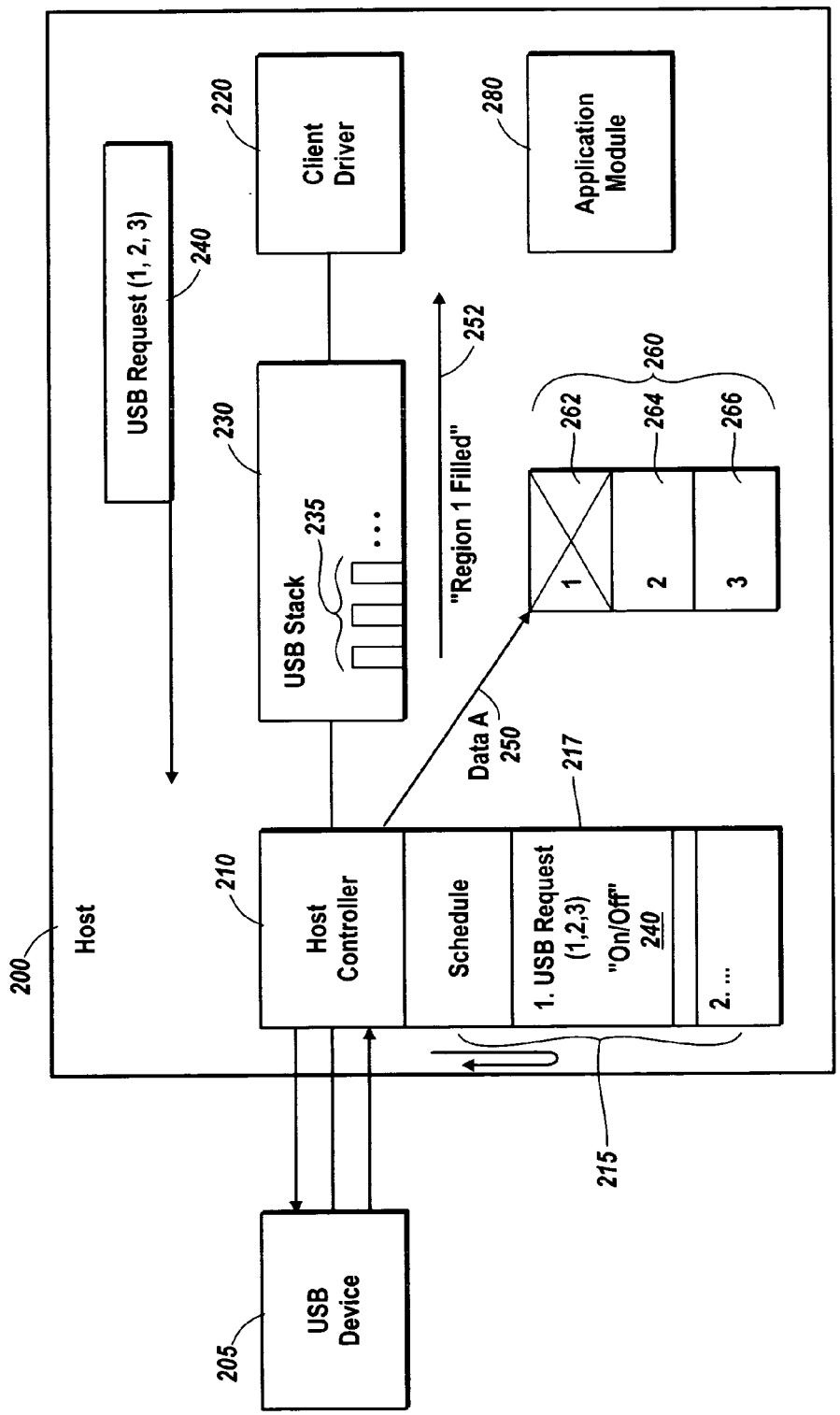
FIGS. 2A–2B illustrate a block diagram for sending data transfer requests in accordance with the present invention.
Figure 2B:
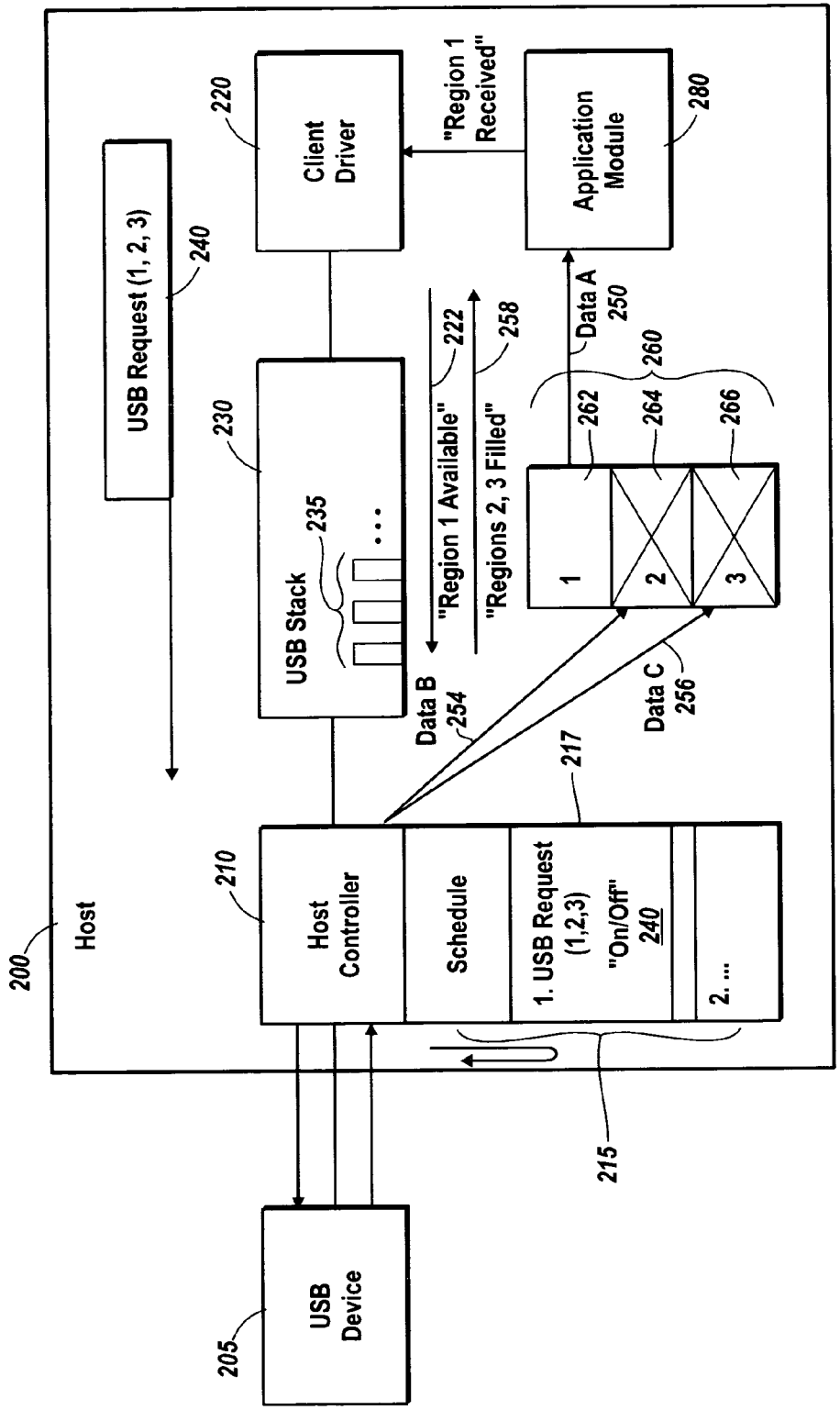

Turning now to FIGS. 2A–2B, the figures illustrate an overview block diagram for sending data transfer requests in accordance with the present invention. Although the figures are shown with relation to a USB device 205 and a USB protocol stack 230 on a host computer 200, the invention can be practiced by any peripheral device and host computer, where the communication means uses another type of interface and protocol stack. For example, a host computer can implement many types of protocol stacks, such as the seven layer Open System Interconnect (OSI) network protocol stack, a USB protocol stack, a Firewire protocol stack, a Bluetooth protocol stack, and so forth. In addition, as already described, some communication protocols can implement different types of drivers for the same protocol stack. For example each of the USB, Ethernet, Firewire, Bluetooth, and HID communication protocols can each communicate information from a peripheral device to a host computer through a USB protocol stack. Accordingly, for purposes of explanation, the present invention will be described primarily in terms of a USB device communicating through a USB protocol stack.

Continuing, FIG. 2A shows a USB device 205 connected with a host computer 200. The host computer 200 includes a Host Controller 210 a client driver 220, a USB protocol stack 230, a host controller 210, a host controller schedule 215, and an application module 280. As described herein, a USB device can be any device such as a game controller, a camera, a PDA, a scanner, a printer, and so forth that communicates with a host computer through a USB interface. A host controller can be generally a chipset or set of instructions on a bus (e.g., a bus on a peripheral component interconnect card—PCI card) that controls how to handle certain types of data. For example, a host controller on a universal serial bus controls how outgoing requests and incoming data are handled between a host computer and a peripheral device over a USB PCI card.

In addition, a host controller driver (not shown) includes computer modules for implementing computer-executable instructions that are specific to the host controller (e.g., 210), and that can, for example, tell the host controller 210 how to perform certain operations, or how the host computer system should interact with the host controller. Thus, a host controller (e.g., 210) interacts essentially directly between a peripheral device (e.g., 205) and a host stack (e.g., 230) through a host controller driver. Nevertheless, the term "host controller" is used herein merely for purposes of convenience in order to refer to both the host controller and the host controller driver. Thus, for example, when the "host controller" sends a signal to the client driver, it will be understood that this is generally done by the host controller driver.

Generally speaking, a "signal" as used herein refers to any number of types of software signals that can be passed between software functions, such as software functions unique to a client driver and software functions unique to a host controller driver. In particular, a signal can often be data (such as a value) passed from one software function to another software function to indicate the occurrence of some event.

One way a host controller 210 operates is through the use of a "schedule" (e.g., 215). The host controller schedule is a data structure that includes one or more sets of scheduled instructions (e.g. 217) for performing certain types of operations in a sequence. The schedule generally follows a loop sequence such that, after processing the last item on sequence of instructions, the host controller will generally start back at the top of the schedule. The host controller schedule can be manipulated by one or more modules on the host computer, including a protocol stack module.

As already described herein, a protocol stack is simply two or more sequentially layers of instructions, each layer generally performing a specific type of operation on data. A protocol stack (e.g., 230) can interface directly with a host controller (e.g., 210), and can handle data so that the host computer system can do something with data when it arrives, or, for example, package the data in some way prior to sending it out. For example, a protocol stack can insert a security header on a data packet prior to sending the packet out on a network, and a protocol stack can interpret an electrical signal arriving at a physical link interface as computer-readable data.

Similar to the host controller driver, a client driver (e.g., 220) comprises a set of instructions that have specific relevance to a certain manufactured device (or class of device) that transfers data to or from the host computer. The client driver translates data from a device to a format that the operating system and host platform can understand, and, therefore, helps the host computer understand signals arriving from a specific peripheral device. The client driver generally interacts with the host controller driver through a protocol stack so that the client driver receives data through the protocol stack, and/or sends data requests through the protocol stack. A client driver can be packaged by the creator of an operating system designer, or can be created separately by the manufacturer of a specific device, or other third-party.

When the client driver 220 initiates a data transfer request 240 to a peripheral device, the client driver 220 can include one or more requests packaged in the single request 240. For example, FIG. 2A shows that USB request 240 includes three separate data transfer requests (i.e., "1", "2", "3") to be sent ultimately to the USB device 205. In addition, the client can include various types of instructions (not shown) with each request such that there is a single set of instructions for the entire request, or several individual sets of instructions that correspond directly with each separate data request (e.g., "1", "2", and "3") packaged in a single "USB Request" 240. In one embodiment, these data request instructions are transfer descriptors. The transfer descriptors can be packaged with the request 240 by the client driver 220, can be packaged with the request 240 by the protocol stack 230, and can simply reside in the host controller 210 and map to the request 240 as the request 240 arrives through the protocol stack.

In any case, the initial request instructions indicate to the host controller in what buffers to place the requested data that will be received from the peripheral device. These receive buffers (e.g., buffer 260) can be created at the time of initiating the data request 240, and can be allocated by the client driver 220. The buffers can be any type of buffer such as a single buffer for a single data request 240, or even a "ring buffer" 260 having multiple buffer regions 262, 264, 266 that correspond to multiple data requests (e.g., "1", "2", and "3" of request 240). In addition, a "ring buffer" can be particularly useful with at least one embodiment of the present invention since ring buffers do not need to be continuously allocated, as their individual regions can be sequentially recycled. The buffers can also be "locked" (depending on the operating system) in the host computer system's memory so that created buffers remain in the control of the client driver, protocol stack, or host controller as appropriate. This can keep the host computer from allocating the buffers for another process while the created buffers are in use by the client driver, protocol stack, or host controller. In any case, FIG. 2A illustrates the present invention in conjunction with a ring buffer 260 having buffer regions "1" 262, "2" 264, and "3" 266 corresponding to the individual data requests "1", "2", and "3" of request 240.

A client driver 220 sends an initial data transfer request 240 to the peripheral device 205 through the protocol stack 230 to the host controller 210. When the protocol stack 230 receives the request 240, the protocol stack 230 can perform one or more functions on the data request prior to handing the request 240 to the host controller 210. For example, the protocol stack 230 can allocate one or more buffers 260 for the request 240, and can insert instructions associated with each data request 240 into the host controller 210 schedule 215. The protocol stack 230 can also, through its various layers 235 map each data request 240 to a corresponding buffer 260 or buffer region 262, 264, 266, as appropriate. The mapping allows the host controller to transfer received data directly from the peripheral device 205 into the corresponding, mapped buffer or buffer region.

In addition, the protocol stack 230 could also allocate its own buffers, and then copy the data (e.g., 250) into the buffers 260 or buffer regions 252 allocated by client driver 220. Similarly, it is also possible that the buffer 260 could have been allocated by the application module 260, rather than the client driver 220. Thus, it is understood that buffers can be created by multiple modules at multiple levels in the signal sequence. In any case, once the data request 240 instructions and mapping information are inserted into the host controller schedule 215, the instructions (e.g., 217) sit in the host controller schedule 215 until the instructions' appropriate "turn".

When it is the turn in the host controller schedule 215 to execute the request instructions 217, the host controller 210 sends an appropriate data request (not shown) to the attached peripheral device, such as USB device 205. If the peripheral device 205 has no data to transmit (e.g., the user has not moved a joystick on a video game device), the host controller can keep the data request instructions 217 in the schedule 215 until the schedule 215 recycles back to the request 217. If the peripheral device 205 has data to transmit, the peripheral device 205 sends the requested data to the host controller 210.

The host controller 210 then directs the requested data directly into the correspondingly mapped buffer 260 or buffer region 262, 264, 266, based on the instructions 217 in the schedule 215. Thus, for example, FIG. 2A shows that the host controller sends requested data "A" 250 into buffer region "1" 262 of ring buffer 260. In one embodiment, when the host controller 210 has filled an allocated buffer or buffer region, the host controller 210 marks the request as inactive to prevent the host controller 210 from overwriting the data with new data from the device until it has been marked as active by the client driver 220. This is illustrated by the "x" mark placed over buffer region 262 of FIG. 2A. The host controller 210 can send the requested data into the appropriate buffer or buffer region in at least one embodiment based on the mapping information included in the data transfer request.

After filling the appropriate buffer or buffer region, the host controller 210 sends a signal 252 to the client driver 220 that the buffer or buffer region has been filled. In another embodiment, the protocol stack 230 can send the signal 252 to the client driver 220 that the buffer or buffer region has been filled. By way of explanation and not of limitation, a buffer is "filled" when data has been placed into a buffer or buffer region. It is not necessary for the data to take up the entire, allocated buffer or buffer region space. For example, it is understood that a device can indicate the end of a packet prior to a given buffer being literally full, in terms of allocated space. Thus, a buffer or buffer region can be filled even though the data take up only a portion of the buffer's or buffer region's allocated space.

Continuing, since this signaling 252 from the host controller 210 is a simple signal 252 indicating "filled" or "not filled", the signal does not require any processing by the protocol stack 230 before the signal reaches the client driver 220. Accordingly, the host computer system 200 incurs no significant resource expense when the host controller 210 sends this signal 252 to the client driver 220. In addition, after the host controller 210 has completed one or more of the requests, the request instructions 217 in the schedule 215 can be turned "off" rather than being deleted from the host controller 210 schedule 215. As will be shown in more detail in FIG. 2B, these operations can aid the request instructions 217 to be turned back "on" again for a next data request, without removing and re-inserting a next set of instructions into the schedule. This is yet another way in which the host 200 can save resources.

FIG. 2B illustrates how the host 200 can process initial and subsequent data transfer requests in sequence. Once the client driver 220 receives the signal 252 (FIG. 2A), the client driver 220 can remove data "A" 250 from the filled buffer 260 or buffer region 262. This is can be done directly by the client driver 220, and can also be done in one embodiment by an application module 280 that operates in conjunction with the client driver 220. The application module 280 can be, for example, a separate application program that is able to read USB device 205 data, an application program having a client driver 220 associated therewith, an additional module that is part of the client driver, and so forth. In any case, the data "A" 250 are removed from the filled buffer 260 or buffer region 262, and the buffer 260 or buffer region 262 becomes available (e.g., no "x" mark on region 262 of FIG. 2B). In an alternative embodiment, the client driver 220 or protocol stack could simply replace the buffer 260 or buffer region by allocating a new buffer or buffer region.

When the client driver 220 or application module 280 has removed the data "A" 250 for processing, the client driver 220 can then send a signal 222 back to the host controller 210 that the respective buffer or buffer region is available again. This signal 222 is similar to signal 252 in that it is a relatively simple signal that does not need to be processed by the protocol stack 230. Accordingly, sending the signal 222 back to the host controller 210 does not incur a significant resource expense in the host computer 200. In addition, when the signal 222 arrives, if the data request instructions 217 are in an "off" state in the host controller schedule 215, the signal 222 can turn the request instructions 217 back to "on". As well, the signal 222 can also inform the host controller 210 which buffer 260 or buffer regions (e.g., 262 in this case) are presently "open" or available. The client driver 220 can therefore initiate a subsequent data request (not shown) from the USB device 205 without allocating a new set of buffers for a new request, mapping a new data request to any new buffers, and inserting a new request into the host controller 210 schedule 215.

FIG. 2B also shows a continuation of the sequence with respect to the incoming data received from the peripheral device 205. As the host controller 210 receives data from the peripheral device 205, the host controller 210 continues to place the data sequentially into the pre-allocated buffer or buffer region to which the data are mapped. For example, the host controller 210 places data "B" 254 into buffer region 264 of ring buffer 260, and places data "C" 256 into buffer region 266 of ring buffer 260. The host controller 210 thereafter fills the respective buffers or buffer regions (indicated by an "x" over regions 264 and 266) as appropriate, and does not overwrite the data in those buffers until the data are removed. As well, having filled the respective buffer regions, the host controller 210 then sends a signal 258 to the client driver 220 indicating that the buffer 260 or buffer regions 264, 266 have been "filled". This signal 258, as in signal 252 and 222, is a signal that does not require additional processing by the protocol stack 230.

Thus, in at least one embodiment of the present invention, the overhead associated with allocating buffers, processing requests, and inserting request instructions into the host schedule typically happens when the request is initiated, and so is minimized for subsequent data requests from the client driver to the peripheral device. For subsequent data requests, all that needs to occur is the relaying of simple signals between the client driver and host controller such as "on/off" or "filled/available", and so forth as already described. One will appreciate that the architecture described herein allows the host 200 and host controller 210 to maximize the host controller's direct memory access (DMA) capabilities, and significantly reduce the overhead otherwise associated with "ping-pong IRPs". The present invention, therefore, provides a significant performance improvement in peripheral device data transfers using a protocol stack. As well, the present invention maximizes the use of protocol bandwidth (e.g., USB bandwidth) since the host controller schedule 215 does not have to be interrupted to remove request instructions 217 from the host controller schedule 215.

The present invention also can be described in terms of methods comprising functional steps and/or non-functional acts. The following is a description of acts and steps that can be performed in practicing the present invention, and are described with some reference to FIGS. 2A–2B. Usually, functional steps describe the invention in terms of results that are accomplished, whereas non-functional acts describe more specific actions for achieving a particular result. Although the functional steps and non-functional acts can be described or claimed in a particular order, the present invention is not necessarily limited to any particular ordering or combination of acts and/or steps.

Figure 3:
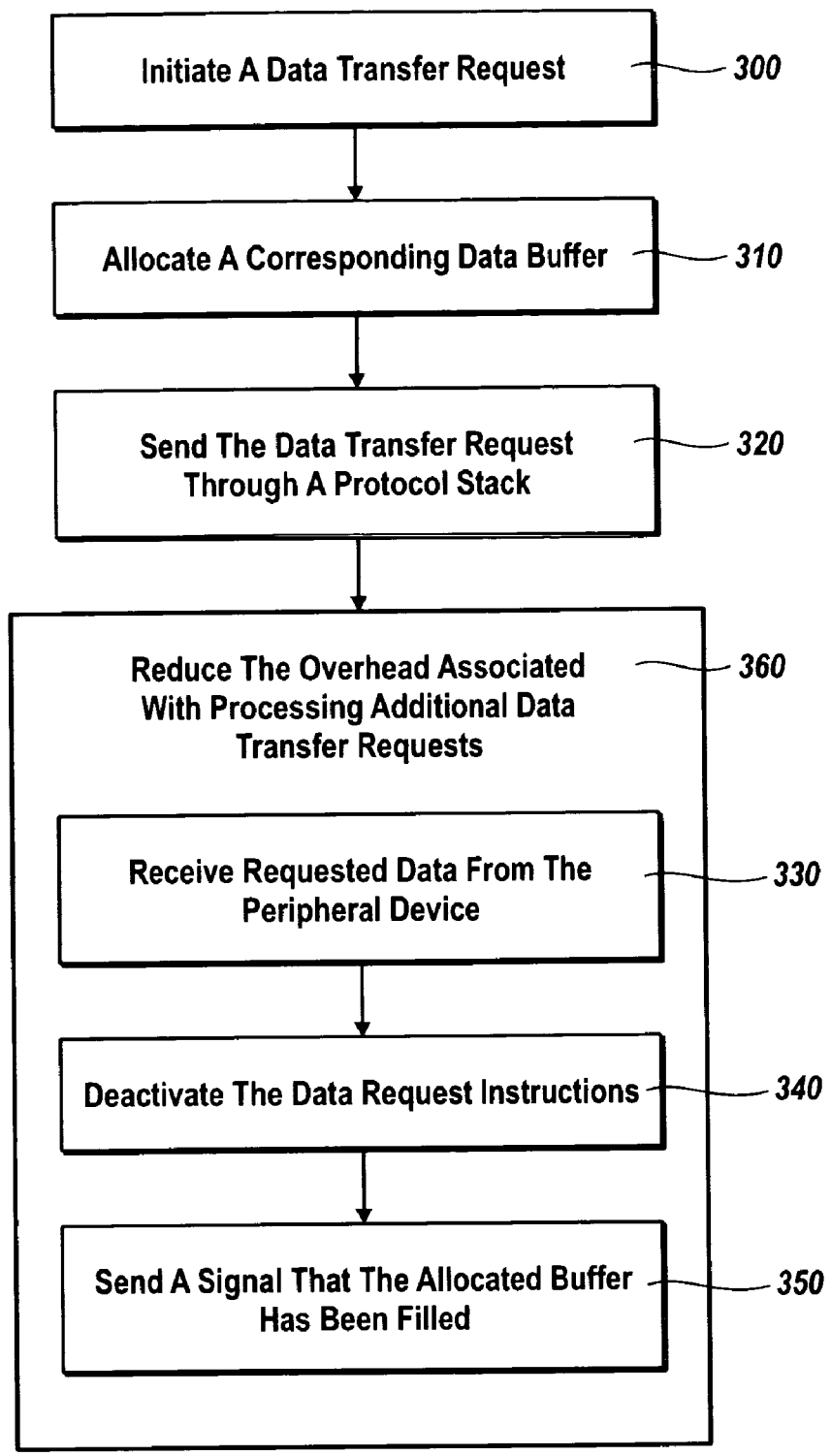
FIG. 3 illustrates a flow chart of a method for improving data transfer efficiency by reducing the overhead that can otherwise be associated with queuing and mapping individual transfer buffers.

FIG. 3 illustrates a flow chart of a method for transferring data packets in a way that can reduce the overhead that can otherwise be associated with transferring data packets through a protocol stack, the method comprising the following. The following method is described in terms of a USB peripheral device, simply for matters of convenience. One will understand after reading the specification and claims, however, that any peripheral devices implementing transfer protocols with multiple data packets and analogous descriptors can perform the following acts and steps.

As illustrated, the method comprises an act 300 of initiating a data transfer request. Act 300 includes, at a client module, initiating a data transfer request that will be sent to a peripheral device, the data transfer request including data request instructions. For example, a client driver 220 that has specific instructions for how the peripheral device operates, can send one or more data requests (i.e., "1", "2", "3" of 240), that can optionally be packaged as a single data transfer request 240. When the client driver initiates the data request, the client driver can package data request instructions (e.g., 217) with the data request, such as one or more transfer descriptors that correspond to each data request.

In addition, the method comprises an act 310 of allocating a corresponding data buffer. Act 310 includes allocating a buffer that corresponds to the data transfer request. For example, the client driver 220 or a software layer (e.g., one of modules 235) in a protocol stack 230 can allocate one or more buffers 260 that correspond with one or more data transfer requests, so that there is a at least one buffer for one data transfer request. The buffer can be a large ring buffer with individual buffer regions (e.g., 262, 264, 266) that correspond to each data transfer request, or can be several individual buffers that correspond to each data transfer request.

The method further comprises an act 320 of sending the data transfer request through a protocol stack. Act 320 includes sending the data transfer request through a protocol stack, wherein the data transfer request is mapped to the allocated buffer, and wherein the request instructions are inserted into a schedule at the host controller. For example, one or more layers 235 in protocol stack 230 can map the allocated buffer 260 or buffer region 262 to an individual data transfer request so that the host controller 210 knows how to direct the data when the host controller 210 receives it from the peripheral device 205. In addition, one of the software layers 235 in the protocol stack 230 can also insert the data request instructions 217 from the data request 240 into the host controller schedule 215.

In addition to the foregoing, the method comprises a functional step 360 of reducing the overhead associated with processing additional data transfer requests. Functional step 360 can comprise any number of corresponding acts to accomplish the result of reducing the overhead associated with processing additional data transfer requests by recycling the allocated buffer, maintaining the data request instructions in the host controller schedule, and relaying information buffer availability information between the host controller and client device. As illustrated in FIG. 3, however, functional step 360 comprises act 330 of receiving requested data from the peripheral device. Act 330 includes receiving requested data from the peripheral device, wherein the requested data are directed by the host controller to the allocated buffer. For example, when the host controller schedule arrives at instructions 217, the host controller 210 sends an appropriate data request to the peripheral device 205, and, if data is present, receives the relevant data for the request.

Based on the mapping information included in the data request instructions 217, the host controller 210 simply directs the received data into the relevant, allocated buffer (e.g., data "A" 250 going into buffer region 262). Step 360 also comprises an act 340 of deactivating the data request instructions. Act 340 includes, upon receiving the requested data into the allocated buffer, an act of deactivating the data request instructions in the host controller schedule, wherein the deactivated data request instructions do not need to be removed from the host controller schedule. For example, the host controller 210 (or the data request instructions 217) can simply turn the data request instructions 217 to an "off" state so that they are not continually processed until another buffer or buffer region is available. This allows the instructions 217 to be recycled for another data request, avoids the need to remove and re-insert the request instructions back into the host controller schedule, and reduces much of the overhead associated with "ping-pong IRPs".

As illustrated, step 360 comprises an act 350 of sending a signal that the allocated buffer has been filled. Act 350 includes sending a signal to the client module that the allocated buffer has been filled. Thus, for example, after the initial overhead of setting up the request, the host controller 210 and client module 220 can relay simply signals back and forth that merely indicate to the other that one of the allocated buffers is either available or unavailable. Consequently, in part because this signaling if buffer availability does not require significant action through the protocol stack 230, the overhead of sending and completing requests is drastically diminished for multiple data transfer requests.

Accordingly, among other benefits, the inventive systems and methods utilize far fewer CPU cycles for multiple data requests than prior methods. Similarly, a host computer 200 can maximize its Direct Memory Access (DMA) capabilities, which can provide certain benefits. For example, this can allow significant operating system speed improvements, which can be particularly beneficial for computerized systems that run in a resource-limited environment, such as laptops and PDAs. As well, the reduced use of computing resources can also reduce the drains otherwise present on a computing system's battery supply, or other energy sources, hence providing many potential cost savings.

This reduced involvement also allows the system to maximize use of available protocol bandwidth (e.g., USB bandwidth). In particular, the invention allows sharing data structures between software (interface) boundaries in such a way as to allow the host controller optimal performance. This inventive interface takes into account both a protocol stack and host controller hardware, and does not require a complete ownership transfer of a client request (transfer).

Figure 4:
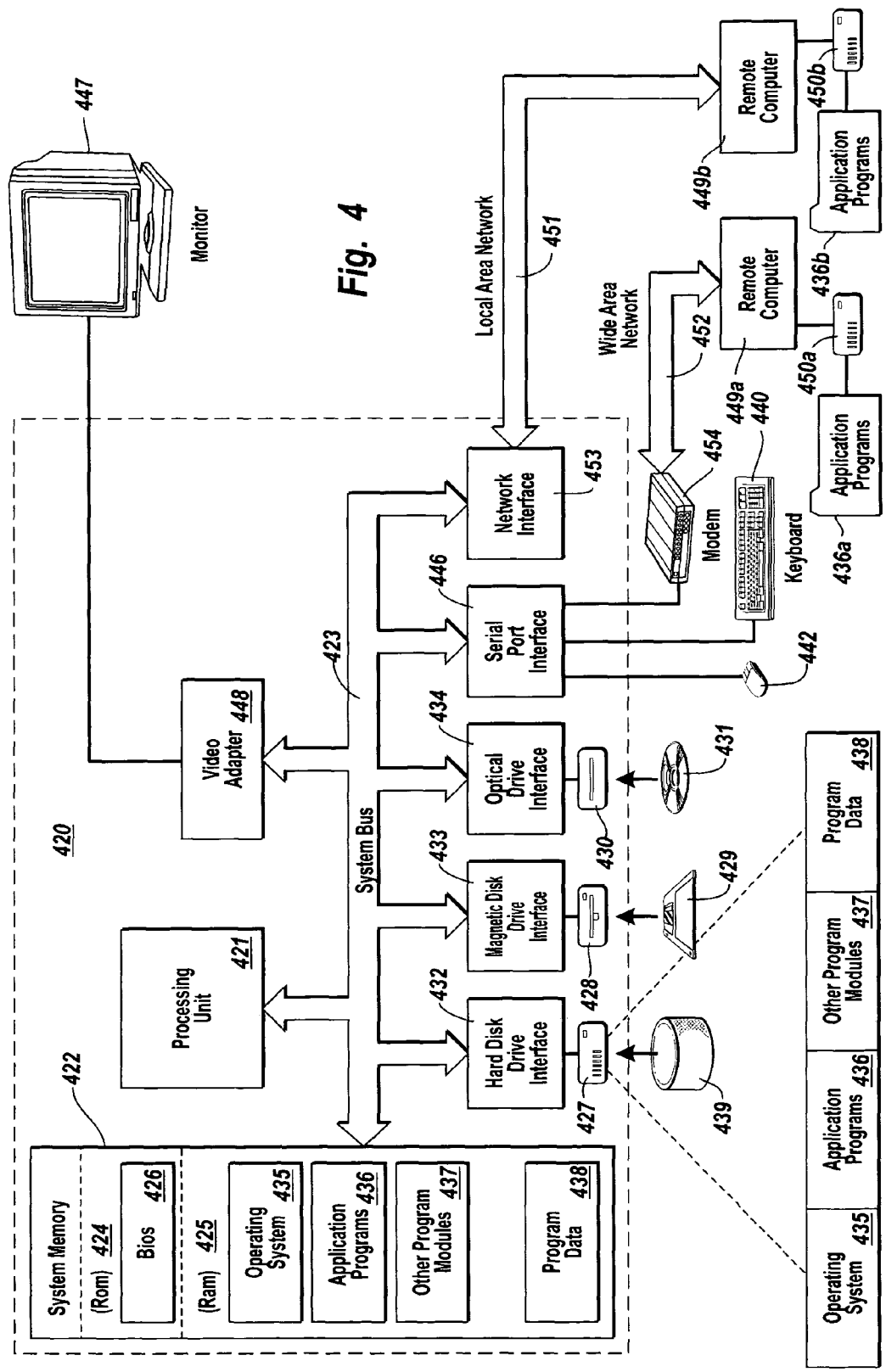
FIG. 4 illustrates a block diagram of one embodiment of a computing environment in which methods of the invention can be practiced.

FIG. 4 and the following discussion are intended to provide a brief, general description of a suitable computing environment in which the invention can be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention can be practiced in network computing environments with many types of computer system configurations, including personal computers, hand-held devices, multi-processor systems, microprocessor-based or programmable consumer electronics, network PCs, minicomputers, mainframe computers, and the like. The invention can also be practiced in distributed computing environments where tasks are performed by local and remote processing devices that are linked (either by hardwired links, wireless links, or by a combination of hardwired or wireless links) through a communications network. In a distributed computing environment, program modules can be located in both local and remote memory storage devices.

With reference to FIG. 4, an exemplary system for implementing the invention includes a general-purpose computing device in the form of a conventional computer 420, including a processing unit 421, a system memory 422, and a system bus 423 that couples various system components including the system memory 422 to the processing unit 421. The system bus 423 can be any of several types of bus structures including a memory bus or memory controller, a peripheral bus, and a local bus using any of a variety of bus architectures. The system memory includes read only memory (ROM) 424 and random access memory (RAM) 425. A basic input/output system (BIOS) 426, containing the basic routines that help transfer information between elements within the computer 420, such as during start-up, can be stored in ROM 424.

The computer 420 can also include a magnetic hard disk drive 427 for reading from and writing to a magnetic hard disk 439, a magnetic disc drive 428 for reading from or writing to a removable magnetic disk 429, and an optical disc drive 430 for reading from or writing to removable optical disc 431 such as a CD ROM or other optical media. The magnetic hard disk drive 427, magnetic disk drive 428, and optical disc drive 430 are connected to the system bus 423 by a hard disk drive interface 432, a magnetic disk drive-interface 433, and an optical drive interface 434, respectively. The drives and their associated computer-readable media provide nonvolatile storage of computer-executable instructions, data structures, program modules and other data for the computer 420. Although the exemplary environment described herein employs a magnetic hard disk 439, a removable magnetic disk 429 and a removable optical disc 431, other types of computer readable media for storing data can be used, including magnetic cassettes, flash memory cards, digital versatile disks, Bernoulli cartridges, RAMs, ROMs, and the like.

Program code means comprising one or more program modules can be stored on the hard disk 439, magnetic disk 429, optical disc 431, ROM 424 or RAM 425, including an operating system 435, one or more application programs 436, other program modules 437, and program data 438. A user can enter commands and information into the computer 420 through keyboard 440, pointing device 442, or other input devices (not shown), such as a microphone, joy stick, game pad, satellite dish, scanner, or the like. These and other input devices are often connected to the processing unit 421 through a serial port interface 446 coupled to system bus 423. Alternatively, the input devices can be connected by other interfaces, such as a parallel port, a game port or a universal serial bus (USB). A monitor 447 or another display device is also connected to system bus 423 via an interface, such as video adapter 448. In addition to the monitor, personal computers typically include other peripheral output devices (not shown), such as speakers and printers.

The computer 420 can operate in a networked environment using logical connections to one or more remote computers, such as remote computers 449*a* and 449*b*. Remote computers 449*a* and 449*b* can each be another personal computer, a server, a router, a network PC, a peer device or other common network node, and typically include many or all of the elements described above relative to the computer 420, although only memory storage devices 450*a* and 450*b* and their associated application programs 436*a* and 436*b* have been illustrated in FIG. 4. The logical connections depicted in FIG. 4 include a local area network (LAN) 451 and a wide area network (WAN) 452 that are presented here by way of example and not limitation. Such networking environments are commonplace in office-wide or enterprise-wide computer networks, intranets and the Internet.

When used in a LAN networking environment, the computer 420 is connected to the local network 451 through a network interface or adapter 453. When used in a WAN networking environment, the computer 420 can include a modem 454, a wireless link, or other means for establishing communications over the wide area network 452, such as the Internet. The modem 454, which can be internal or external, is connected to the system bus 423 via the serial port interface 446. In a networked environment, program modules depicted relative to the computer 420, or portions thereof, can be stored in the remote memory storage device. It will be appreciated that the network connections shown are exemplary and other means of establishing communications over wide area network 452 can be used.

The present invention can be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. In a computerized environment including a host computer, a method for reducing the overhead that can otherwise be associated with transferring data packets through a protocol stack by allocating a dedicated buffer region for transferring data packets from a peripheral device to a client driver based on an initial request for data, without sending the requested data through the protocol stack, the method comprising the following:
    at a client module, an act of initiating a data transfer request that will be sent to a peripheral device, the data transfer request including data request instructions for allocating a buffer that corresponds to the data transfer request;
    an act of sending the data transfer request through a protocol stack, wherein the data transfer request is mapped to the allocated buffer in order to allow requested data to be directly transferred from the peripheral device to the buffer, and wherein the request instructions are inserted into a schedule at the host controller;
    an act of receiving at least a portion of the requested data from the peripheral device, which based on the mapping is directed by the host controller to the allocated buffer without processing the requested data through the protocol stack;
    upon receiving the at least a portion of the requested data into the allocated buffer, an act of deactivating the data request instructions in the host controller schedule, wherein the deactivated data request instructions do not need to be removed from the host controller schedule in order to reduce processing requirements associated with reinserting the data request instructions into the controller schedule; and
    an act of sending a signal that does not need to be processed by the protocol stack to the client module indicating that the allocated buffer has been filled in order to allow the client module to process the at least a portion of the requested data.

2. The method as recited in claim 1, wherein the peripheral device is one or more of a game controller, a personal device assistant, a keyboard, or a mouse, and wherein the peripheral device is either a wired or wireless device.

3. The method as recited in claim 1, wherein the peripheral device communicates over one or more of a USB communication protocol, Ethernet communication protocol, Bluetooth communication protocol, and HID communication protocol.

4. The method as recited in claim 1, further comprising locking the allocated buffer into physical memory.

5. The method as recited in claim 4, further comprising removing the requested data from the allocated buffer, and sending a signal that the allocated buffer is available to be filled again.

6. The method as recited in claim 5, wherein the client module removes the requested data from the allocated buffer.

7. The method as recited in claim 5, wherein the client module is one or more of a client driver or an application program, and wherein the client module includes specific information about the peripheral device.

8. The method as recited in claim 5, further comprising sending a signal to the host controller that the allocated buffer is available to be filled again.

9. The method as recited in claim 8, wherein the signal to the host controller that the allocated buffer is available to be filled again further comprises a signal to activate the data request instructions in the host controller schedule, such that a new data request instructions do not need to be inserted into the host controller schedule for a new data request.

10. The method as recited in claim 1, wherein one or more of software layers in the protocol stack perform the acts of allocating the corresponding buffer, mapping the buffer to the data transfer request, and inserting the data request instructions in the host controller schedule.

11. The method as recited in claim 1, wherein the data transfer request includes one or more other data transfer requests packaged as a single data transfer request.

12. The method as recited in claim 11, wherein the data request instructions comprise one or more transfer descriptors that provide instructions corresponding to the data transfer request and each of the one or more other data transfer requests packaged as a single data transfer request.

13. The method as recited in claim 12, wherein the allocated buffer is a ring buffer comprising one or more buffer regions that correspond to the data transfer request and the one or more other data transfer requests.

14. In a computerized environment including a host computer, a method for reducing the overhead that can otherwise be associated with transferring data packets through a protocol stack by allocating a dedicated buffer region for transferring data packets from a peripheral device to a client driver based on a recyclable initial request for data, without sending the requested data through the protocol stack, the method comprising the following:
    at a client module, an act of initiating a data transfer request that will be sent to a peripheral device, the data transfer request including data request instructions for allocating a buffer, which is locked to the data transfer request in such a way that prevents a host controller from allocating the buffer for another purpose until completed processing of requested data for the data transfer request;
    an act of sending the data transfer request through a protocol stack, wherein the data transfer request is mapped to the allocated buffer in order to allow the requested data to be directly transferred from the peripheral device to the buffer, and wherein the request instructions are inserted into a schedule at the host controller; and
    a step for reducing the overhead associated with processing additional data transfer requests by directly sending the requested data to the buffer for processing by the client module, unlocking and recycling the allocated buffer once the requested data has been processed by the client module, maintaining the data request instructions by deactivating them in the host controller schedule until processing of the requested data is complete, and relaying information buffer availability information between the host controller and client device.

15. The method as recited in claim 14, wherein the step for reducing the overhead associated with processing additional data transfer requests comprises:
an act of receiving requested data from the peripheral device, wherein the requested data are directed by the host controller to the allocated buffer;
upon receiving the requested data into the allocated buffer, an act of deactivating the data request instructions in the host controller schedule, wherein the deactivated data request instructions do not need to be removed from the host controller schedule; and
an act of sending a signal to the client module that the allocated buffer has been filled.

16. In a computerized environment including a host computer, a computer program product with computer readable storage media having computer-executable instructions thereon for implementing a method for reducing the overhead that can otherwise be associated with transferring data packets through a protocol stack by allocating a dedicated buffer region for transferring data packets from a peripheral device to a client driver based on a recyclable initial request for data, without sending the requested data through the protocol stack, the method comprising the following:
at a client module, an act of initiating a data transfer request that will be sent to a peripheral device, the data transfer request including data request instructions for allocating a buffer that corresponds to the data transfer request;
an act of sending the data transfer request through a protocol stack, wherein the data transfer request is mapped to the allocated buffer in order to allow requested data to be directly transferred from the peripheral device to the buffer, and wherein the request instructions are inserted into a schedule at the host controller;
an act of receiving at least a portion of the requested data from the peripheral device, which based on the mapping is directed by the host controller to the allocated buffer without processing the requested data through the protocol stack;
upon receiving the at least a portion of the requested data into the allocated buffer, an act of deactivating the data request instructions in the host controller schedule, wherein the deactivated data request instructions do not need to be removed from the host controller schedule in order to reduce processing requirements associated with reinserting the data request instructions into the controller schedule; and
an act of sending a signal that does not need to be processed by the protocol stack to the client module indicating that the allocated buffer has been filled in order to allow the client module to process the at least a portion of the requested data.

17. The computer program product as recited in claim 16, further comprising locking the allocated buffer into physical memory.

18. The computer program product as recited in claim 17, further comprising removing the requested data from the allocated buffer, and sending a signal that the allocated buffer is available to be filled again.

19. The computer program product as recited in claim 18, wherein the client module removes the requested data from the allocated buffer.

20. The computer program product as recited in claim 19, wherein the client module is one or more of a client driver or an application program, and wherein the client module includes specific information about the peripheral device.

21. The computer program product as recited in claim 17, further comprising sending a signal to the host controller that the allocated buffer is available to be filled again.

22. The computer program product as recited in claim 21, wherein the signal to the host controller that the allocate buffer is available to be filled again further comprises a signal to activate the data request instructions in the host controller schedule, such that a new data request instructions do not need to be inserted into the host controller schedule for a new data request.

23. The computer program product as recited in claim 16, wherein one or more of software layers in the protocol stack perform the acts of allocating the corresponding buffer, mapping the buffer to the data transfer request, and inserting the data request instructions in the host controller schedule.

24. The computer program product as recited in claim 23, wherein the data transfer request includes one or more other data transfer requests packaged as a single data transfer request.

25. The computer program product as recited in claim 24, wherein the data request instructions comprise one or more transfer descriptors that provide instructions corresponding to the data transfer request and each of the one or more other data transfer requests packaged as a single data transfer request.

26. The computer program product as recited in claim 25, wherein the allocated buffer is a ring buffer comprising one or more buffer regions that correspond to the data transfer request and the one or more other data transfer requests.

27. In a computerized environment including a host computer, a computer program product with computer readable storage medium having computer-executable instructions thereon for implementing a method for reducing the overhead that can otherwise be associated with transferring data packets through a protocol stack by allocating a dedicated buffer region for transferring data packets from a peripheral device to a client driver based on a recyclable initial request for data, without sending the requested data through the protocol stack, the method comprising the following:
at a client module, an act of initiating a data transfer request that will be sent to a peripheral device, the data transfer request including data request instructions for allocating a buffer, which is locked to the data transfer request in such a way that prevents a host controller from allocating the buffer for another purpose until completed processing of at least a portion of requested data fro the data transfer request;
an act of sending the data transfer request through a protocol stack, wherein the data transfer request is mapped to the allocated buffer in order to allow the requested data to be directly transferred from the peripheral device to the buffer, and wherein the request instructions are inserted into a schedule at the host controller; and
a step for reducing the overhead associated with processing additional data transfer requests by directly sending the requested data to the buffer for processing by the client module, unlocking and recycling the allocated buffer once the requested data has been processed by the client module, maintaining the data request instructions by deactivating them in the host controller schedule until processing of the requested data is complete, and relaying information buffer availability information between the host controller and client device.

28. The computer program products as recited in claim 27, wherein the step for reducing the overhead associated with processing additional data transfer requests comprises:

an act of receiving requested data from the peripheral device, wherein the requested data are directed by the host controller to the allocated buffer;

upon receiving the requested data into the allocated buffer, an act of deactivating the data request instructions in the host controller schedule, wherein the deactivated data request instructions do not need to be removed from the host controller schedule; and an act of sending a signal to the client module that the allocated buffer has been filled.

* * * * *